US011548639B2

(12) United States Patent
Bauer et al.

(10) Patent No.: US 11,548,639 B2
(45) Date of Patent: Jan. 10, 2023

(54) STOWAGE AND REMOVAL SYSTEM FOR CONTAINERS IN A VEHICLE, AND A VEHICLE HAVING A SYSTEM OF THIS TYPE

(71) Applicant: Airbus Operations GmbH, Hamburg (DE)

(72) Inventors: Michael Bauer, Hamburg (DE); Hans-Gerhard Giesa, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 342 days.

(21) Appl. No.: 16/838,303

(22) Filed: Apr. 2, 2020

(65) Prior Publication Data

US 2020/0317343 A1 Oct. 8, 2020

(30) Foreign Application Priority Data

Apr. 3, 2019 (DE) .......................... 102019108748.1

(51) Int. Cl.
| | | |
|---|---|---|
| *B64D 11/04* | (2006.01) | |
| *B60R 5/00* | (2006.01) | |
| *B60R 7/02* | (2006.01) | |
| *B60R 7/08* | (2006.01) | |

(52) U.S. Cl.
CPC .............. *B64D 11/04* (2013.01); *B60R 5/006* (2013.01); *B60R 7/02* (2013.01); *B60R 7/08* (2013.01)

(58) Field of Classification Search
CPC .............................. B64D 11/04; B64D 11/0007
See application file for complete search history.

(56) References Cited

U.S. PATENT DOCUMENTS

| | | | |
|---|---|---|---|
| 6,454,208 B1* | 9/2002 | Nervig ................... | B64D 9/003 |
| | | | 244/118.6 |
| 9,821,911 B2* | 11/2017 | Wallbott .................... | B25J 1/08 |
| 10,899,376 B2* | 1/2021 | Bauer ....................... | B62B 5/00 |
| 2008/0001031 A1* | 1/2008 | Doebertin .............. | B64D 11/04 |
| | | | 244/118.1 |
| 2008/0136299 A1 | 6/2008 | Peurifoy | |

(Continued)

FOREIGN PATENT DOCUMENTS

| | | | |
|---|---|---|---|
| EP | 0941923 A2 * | 9/1999 | |
| EP | 3034403 A1 | 6/2016 | |

(Continued)

OTHER PUBLICATIONS

European Search Report and Written Opinion from corresponding European Patent Application No. 20167763.0 dated Aug. 14, 2020.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A stowage and removal system is provided for a receiving space for container storage in a vehicle. It has a rail system in a bottom region of the receiving space, on which a transfer plate can be moved and which can assume a storage position and an entry and removal position for the container. The container storage position is provided with its rear wall in a region of the receiving space rear wall. The entry and removal position is provided in the region of a push-in opening, lying opposite the rear wall, for pushing in and removing a container into or from the receiving space.

12 Claims, 10 Drawing Sheets

(56) References Cited

U.S. PATENT DOCUMENTS

| | | | |
|---|---|---|---|
| 2009/0304482 A1 | 12/2009 | Sanford et al. | |
| 2011/0309194 A1* | 12/2011 | Pangalila | B64D 11/04 244/131 |
| 2012/0325960 A1 | 12/2012 | Saint-Jalmes et al. | |
| 2013/0299280 A1* | 11/2013 | Friedrich | B64D 11/0007 187/245 |
| 2015/0367942 A1 | 12/2015 | Parry et al. | |
| 2016/0167785 A1* | 6/2016 | Roth | B64D 11/04 206/335 |

FOREIGN PATENT DOCUMENTS

| | | |
|---|---|---|
| FR | 2954276 A1 | 6/2011 |
| WO | 2008091287 A2 | 7/2008 |
| WO | 2014125046 A1 | 8/2014 |
| WO | 2016034531 A1 | 3/2016 |

* cited by examiner

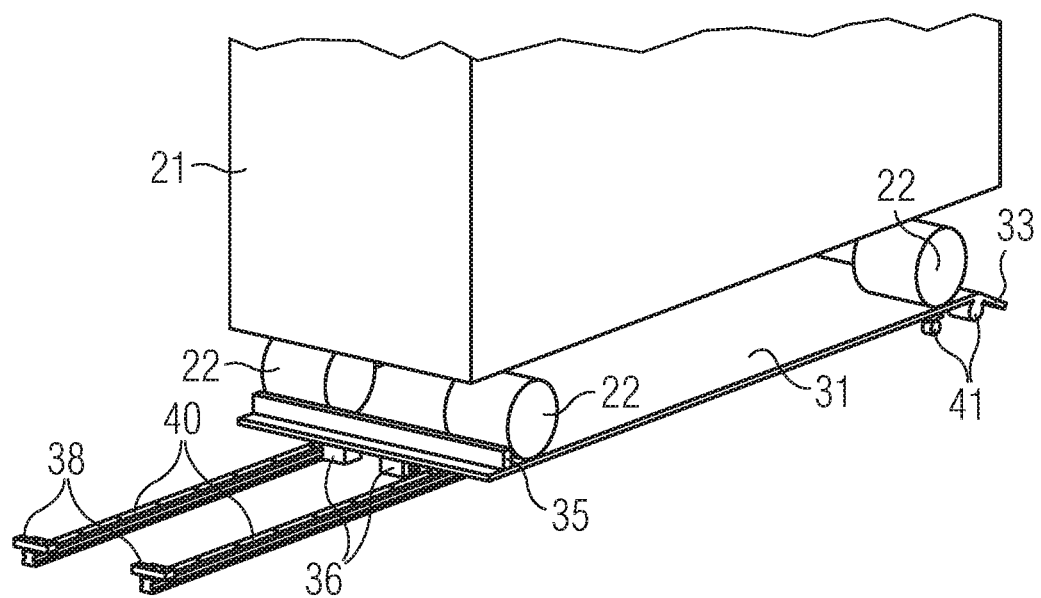

STOWAGE AND REMOVAL SYSTEM FOR CONTAINERS IN A VEHICLE, AND A VEHICLE HAVING A SYSTEM OF THIS TYPE

CROSS-REFERENCES TO RELATED APPLICATIONS

This application claims the benefit of the German patent application No. 102019108748.1 filed on Apr. 3, 2019, the entire disclosures of which are incorporated herein by way of reference.

FIELD OF THE INVENTION

The invention relates to a stowage and removal system for containers in a vehicle, and to a vehicle with a system of this type.

BACKGROUND OF THE INVENTION

Vehicles which serve to transport a multiplicity of passengers are usually equipped with cabins with passenger seats, one or more on-board toilets and optionally one or more galleys. Concepts exist, in particular, in the case of making galleys in commercial aircraft more compact, in the case of which concepts storage spaces for serving carts (trolleys) are used, in which storage spaces a plurality of serving carts are arranged behind one another. This usually relates to the use of serving carts in accordance with ATLAS, ARINC or KSSU standards and the combined use of a serving cart with a full design depth ("Full Size Trolley") and a serving cart with half a design depth ("Half Size Trolley") or two serving carts with a full design depth (two "Full Size Trolleys"). For supply containers which have to be stored as boxes in the galley, stowage of two boxes or more behind one another can also be possible on account of the design depth for the storage space.

In order to remove serving carts from a storage space of this type, a handle which is situated on a top side is usually gripped by a user and is pulled out of the storage space. For this purpose, the serving cart is equipped with rollers which are provided for the movement within the galley region and also for the serving process within the aircraft cabin for moving the serving cart in the aircraft longitudinal aisle from seat row to seat row. A removal apparatus is necessarily provided for serving carts in the rear storage spaces. If, in particular, a full size trolley is parked in a rear storage space, there is possibly a greater effort for a cabin attendant and also the accessibility is made more difficult, for conveying the full size trolley out of the rear storage space.

Removal devices of this type for serving carts are known from WO 2016 034 531 A1 or else WO 2014 125 046 A1. Here, movement to and fro of the serving cart in the storage space is provided via rods and engagement apparatuses with respect to the trolley body. A removal from the rear storage space via cable systems is also known for catering containers in boxes. The operability and manageability of a serving cart or a box, even for storage spaces which are arranged behind one another, can be improved, however.

SUMMARY OF THE INVENTION

In order to make galleys more compact, it might be helpful to arrange catering containers, such as serving carts or else boxes, behind one another in a receiving space. This is not optimum in terms of manageability, however, since a rear serving cart or a rear box can be reached by cabin crew merely with great difficulty, since it is at a relatively great spacing from a push-in opening of the storage space.

As a consequence, an object of the invention lies in proposing an apparatus or a galley, by way of which catering containers which are arranged behind one another in a receiving space can be managed easily by cabin crew, with the result that, in particular, catering containers which are arranged at the rear in a receiving space can be reached as simply as possible.

The object is achieved by way of a stowage and removal system for catering containers in a vehicle having the features defined in claim 1. Advantageous embodiments and developments can be gathered from the subclaims and the following description. The use of a stowage and removal system of this type is not restricted to catering containers; containers for other purposes can also be moved by way of the stowage and removal system according to the invention.

A stowage and removal system for containers in a vehicle is proposed, which stowage and removal system has substantially a rail system in the bottom region and can move a supply container from a storage position to a removal position. For this purpose, the system has a rail system in the bottom region of the receiving space. The bottom can be, for example, a bottom element of the receiving space or else a vehicle floor, in which the receiving space is arranged. The rail system can be fastened on the bottom or else can be integrated into the floor. The selection of the corresponding fastening on the bottom or integration into the bottom takes place with the aim of minimizing the overall design height of the rail system, in order to take the structural conditions of the receiving space into consideration which are adapted to the dimensions of the corresponding catering containers. An alternative is also conceivable for integrating the rail system into the side walls of the receiving space, the rail system then running in the region close to the floor.

Furthermore, a transfer plate is provided which can be moved on the rail system and can assume a storage position and a removal position for the catering container. The storage position of the catering container with its rear wall is provided in an adjacent manner with respect to the rear wall of the receiving space. The removal position is provided in the region of a push-in opening for pushing in and removing a catering container into or from the receiving space. The push-in opening is configured so as to lie opposite the rear wall of the receiving space.

In one preferred refinement, the rail system has guide rails, preferably linear systems or else telescopic guide rails which are arranged in the region of the storage position on the floor in the movement direction of the transfer plate. In order to be independent of the floor, guide rails on the side walls close to the floor are also possible, as part of the receiving space. The linear systems can be configured, for example, as guide rails which correspond with movement bodies such as running rollers or with rail bodies comprising ball bearings or rolling bodies. Movement bodies can also be used as sliding bodies. For example, linear guides with plastic plain bearings can be used. Movement bodies of this type are arranged on the transfer plate.

In one preferred embodiment, the receiving space is configured to receive at least two catering containers which are arranged behind one another, and the rear catering container is positioned on the transfer plate. Therefore, a rear and a front storage space are provided in a manner which is oriented along a common longitudinal axis.

As a consequence, the receiving space can be filled in a highly comfortable manner with relatively large containers which can be rolled, and allows the highly space-saving, space-efficient accommodation of serving carts behind one another, in particular, in the case of the use in a cabin of a commercial aircraft.

After a conventional removal of a front container which is arranged at the push-in opening, the rear container which is arranged spaced apart clearly from the push-in opening in the interior of the receiving space can be removed by way of the use of a removal and stowage system.

For supply containers, for example serving carts, which are arranged in the rear storage spaces of a galley in a vehicle, the stowage and removal system according to the invention is preferably provided. If, in particular, a full-size trolley is parked in a rear storage space, it is a great relief for the cabin attendants to position the relatively heavy container by means of the transfer plate into an access region which can be reached satisfactorily, and to convey it out of the rear storage space in a simple way.

For supply containers which have to be stored as boxes in the galley, stowage of at least two boxes behind one another can also be possible on account of the design depth for the storage space. Here, the rear storage space can also be equipped with a stowage and removal system according to the invention.

The rear wall of the receiving space, which rear wall is arranged so as to lie opposite the push-in opening, is a rear boundary of a storage space in the receiving space, against which rear boundary a rearmost container bears or comes into contact or is adjacent. This corresponds to the storage position of the supply container. The size and shape of the container can be selected depending on the requirement in the vehicle. If the vehicle is realized as a commercial aircraft, the use of serving carts in accordance with relevant standards is appropriate, for instance in accordance with the ATLAS standard. The advantages according to the invention become particularly clear, in addition, when the containers which can be rolled have a depth extent which is greater than from 30 to 40 cm; in particular, in the case of a full size trolley which has approximately a length of from 80 to 82 cm.

The transfer plate is equipped with at least one locking apparatus which realizes the locking of the transfer plate for the entry and removal position. It can also be provided in addition or optionally for fixing in the storage position, that is to say, the container which adjoins the rear wall by way of fixing of the transfer plate in its position there. For this purpose, the locking apparatus can have locking elements, preferably front and rear locking elements. They can be configured in any desired way which allows the simple locking and the simple release for the removal of the relevant container. The locking can be realized, in particular, by way of a movable bolt element which acts in a positively locking manner and corresponds with a fitting shape feature of the container or the transfer plate.

The at least one locking apparatus can preferably be capable of being actuated mechanically or electromechanically. Automatic locking and/or unlocking are/is also conceivable. For example, when the entry and removal position is reached, automatic locking of the transfer plate takes place in that position, and the transfer plate is unlocked in an active manner for the movement into the storage position. An operating element which is connected to the locking apparatus can be arranged, in particular, on a side which faces the user. As a result, it is made very simple for a user to release the locking apparatus and/or to obtain knowledge about the instantaneous locking state. The specific configuration of the operating element can be dependent on the type of locking apparatus. Pulling, pushing and rotary elements are appropriate which forward a desired axial, rotational or combined axial and rotational movement to the first locking apparatus by way of a linkage or another device.

For example, a foot pedal can be provided which actuates the corresponding locking elements via cable pulls. As an alternative, the locking apparatus can be actuated and triggered via signal lines or else in a wireless manner. In a further alternative embodiment, a hand crank can engage into a corresponding lock element and can trigger the actuation of the locking means. In addition, it is also conceivable to move the transfer plate by way of the crank, by pushing or pulling force acting on the transfer plate.

One core component of the stowage and removal system according to the invention is the transfer plate which receives the catering container and can be moved between the storage position and the removal position. In order to make secure storage of the catering container on the transfer plate possible, at least one positioning device is provided. The latter is preferably configured as a stop in the rear region of the plate, and serves as a stop element and a positioning element for the rollers of the catering container.

Furthermore, the transfer plate can have assisting ramps which facilitate the moving up of the catering containers which can be rolled in order to overcome the height difference between the bottom and the transfer plate. The assisting ramps can also be provided at a corresponding position on the floor, which then makes the moving up and moving down of the catering containers which can be rolled possible in an operative connection with the transfer plate which is positioned at the correct location. This is possible as an alternative or else in combination with the assisting ramps on the transfer plate.

Furthermore, the rail system preferably has two guide rails which run parallel to the outer edges of the transfer plate and are provided below the transfer plate. The guide rails are therefore concealed by way of the transfer plate in the storage position. The rails can run from the rear wall of the receiving space as far as into the region of the center of the receiving space, and preferably correspond with movement bodies which are arranged on the bottom side, in the rear region of the transfer plate. Therefore, the arrangement of the guide rails is restricted to the region of the rear storage space.

In other words, the guide rails can be configured as linear guides which are equipped in each case with a rail element and a movement body, the rails being fixed on the bottom of the receiving space or the aircraft floor, and the respective movement element being arranged on the transfer plate.

Furthermore, a central guide rail can be provided which runs in a centered manner with respect to the outer guide rails (also called base rails) and offset longitudinally with respect to the base rails, and protrudes beyond the center of the receiving space into the front region of the receiving space. The central guide rail, with an accordingly corresponding movement body on the transfer plate, can protrude into the front region of the receiving space to such an extent that the transfer plate is supported sufficiently even in the front region for the removal position. The central rail is preferably positioned and fixed in the region of the bottom of the receiving space in such a way that it does not protrude beyond the front edge of the transfer plate in the removal position.

As an alternative, the central rail, as has been proposed in combination with the base rails, can also be used as a sole rail. For this purpose, a second corresponding movement body would then possibly also have to be provided on the transfer plate.

For the secure and stable support of the transfer plate during the movement, rolling elements can be provided on the transfer plate in addition to the mounting on the rail system. Rolling elements are preferably arranged in the front region of the transfer plate.

Rolling elements can also additionally be provided on the edge region of the transfer plate, however, in order to improve the stability of the transfer plate.

The movement of the transfer plate is possible merely by way of a small handling force on account of the selection of easy-running rail systems and/or guide systems. In order to move the transfer plate from the removal position to the storage position or vice versa, it can therefore be sufficient that the movement of the transfer plate is actuated by way of an operating element by means of actuators with motorized assistance. By way of example, the movement bodies which are fastened to the transfer plate can be equipped with actuators and can be moved mechanically by way of an actuation. As an alternative, a manual movement of the transfer plate can likewise be considered if merely low handling forces are necessary and the access region for an operator is sufficient. Linkages can also possibly be provided which facilitate the access to the transfer plate and, furthermore, possibly perform the actuation of the locking apparatus. Further it may be an option that the operator control element carry out a wireless control of the actuators for the movement of the transfer plate as well as a status indication for the position of the transfer plate.

Furthermore, the invention relates to a vehicle with a cabin and a cabin monument which is situated therein and has a stowage and removal system in accordance with the preceding description.

BRIEF DESCRIPTION OF THE DRAWINGS

Further features, advantages and possible applications of the present invention result from the following description of the exemplary embodiments and the figures. Here, all the features which are described and/or depicted form, per se and in any desired combination, the subject matter of the invention, even independently of their combination in the individual claims or their back-references. Furthermore, identical reference numerals represent identical or similar objects in the figures.

FIG. 5 shows the supply container with the rear locking apparatus.

DETAILED DESCRIPTION OF THE PREFERRED EMBODIMENTS

Figure 1:
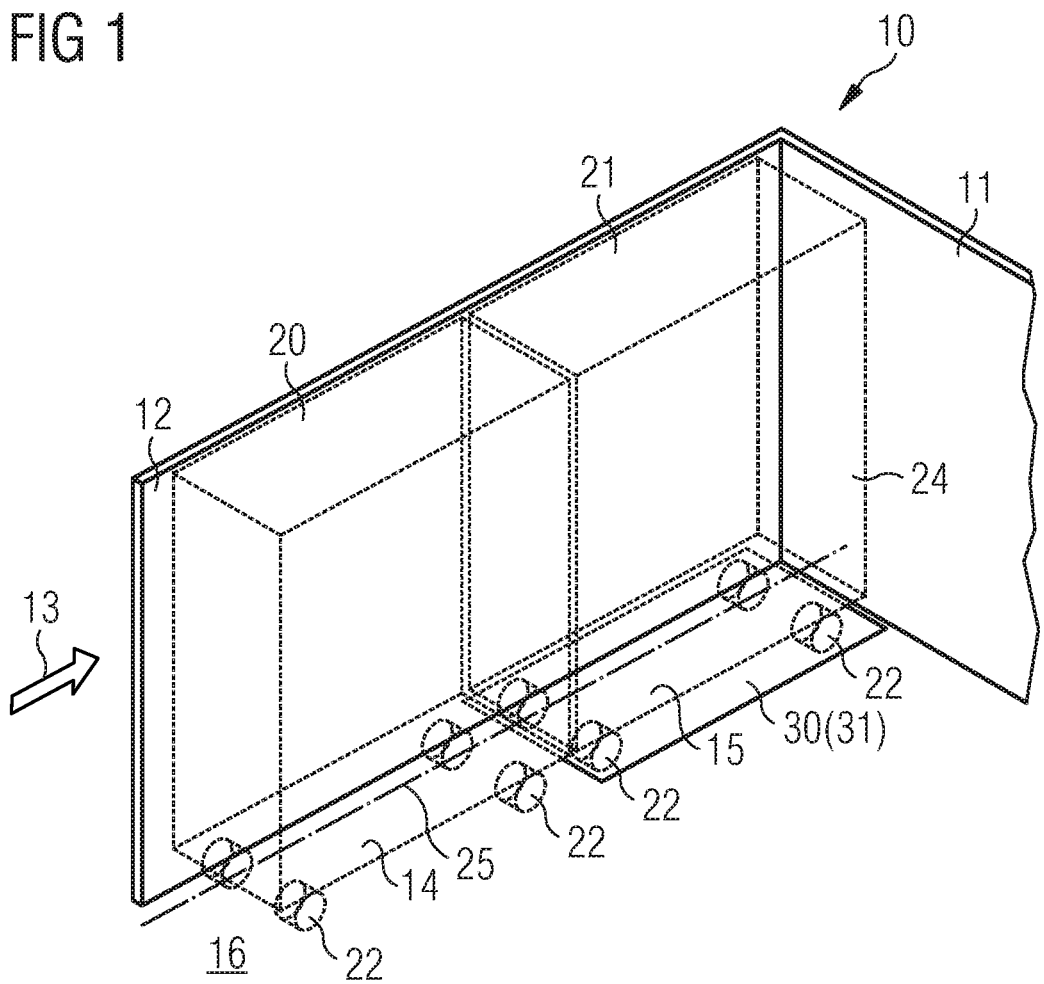
FIG. 1 shows a three-dimensional illustration of a receiving space with two supply containers which are arranged behind one another on two trolley storage spaces which are arranged behind one another.

FIG. 1 shows a receiving space 10 with two supply containers 20 and 21 which are arranged behind one another on two trolley storage spaces 14 and 15 which are arranged behind one another. By way of example, the vehicle is a commercial aircraft in this exemplary embodiment, and the supply containers 20 and 21 which can be rolled are therefore configured as serving carts (what are known as trolleys) in accordance with the ATLAS standard. These are what are known as "Full Size Trolleys," that is to say, serving carts with a full design depth of approximately 80 cm. The receiving space 10 is usually fully closed and is accessible via a push-in opening 13. It can be a constituent part of a galley. For the storage of the supply containers 20 and 21, they are pushed via the push-in opening 13 (indicated by way of an arrow symbol) into the receiving space 10. The rear trolley storage space 15 is provided in the shown receiving space 10 in such a way that the rear supply container 21 runs with its rear container wall 24 in an adjoining or adjacent manner with respect to the rear wall 11 of the receiving space 10. The front trolley storage space 14 and the rear trolley storage space 15 are oriented along a common longitudinal axis 25. The front supply container 20 is therefore positioned precisely in front of the rear supply container 21, with the result that the removal of the rear supply container 21 from the storage position is possible only if the front supply container 20 is removed and therefore the front trolley storage space 14 is free. The access via the push-in opening 13 to the rear trolley storage space 15 can be carried out with difficulty or even cannot be carried out without aids by way of the cabin crew on account of the limited arm reach during handling. Even if the arrangement of trolley storage spaces is admittedly not preferred in a commercial aircraft under the aspect of operability, structural constraints can lead to a contribution to an optimized space utilization in the limited space of a commercial aircraft if supply containers of this type can also be arranged behind one another.

In order to make the removal or else the parking of the supply container 21 possible on the rear storage space 15, a stowage and removal system 30 for the rear storage space 15 is provided according to the invention. The stowage and removal system 30 is installed in the bottom region, below the supply container 21. A transfer plate 31 is substantially provided which is designed such that it can be pulled out and therefore makes loading and removal of the supply container 21 possible at a position which is comfortable for the cabin crew. In the following text, there is a detailed description of the stowage and removal system 30 on the basis of FIGS. 2 to 9.

Figure 2A:
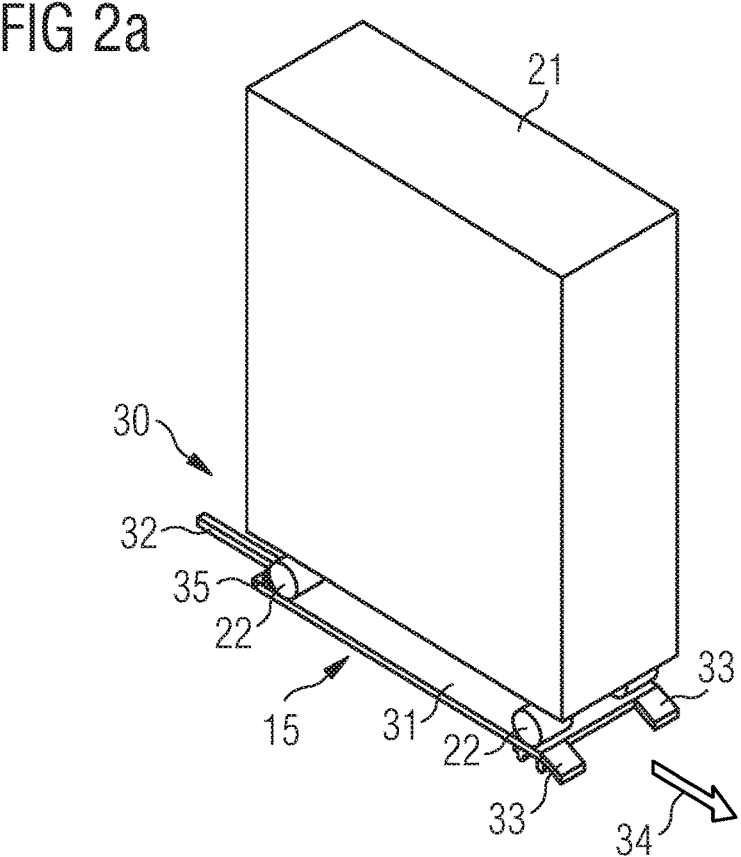
FIG. 2a and FIG. 2b show the supply containers on the trolley storage space with a stowage and removal system according to the invention.
Figure 2B:
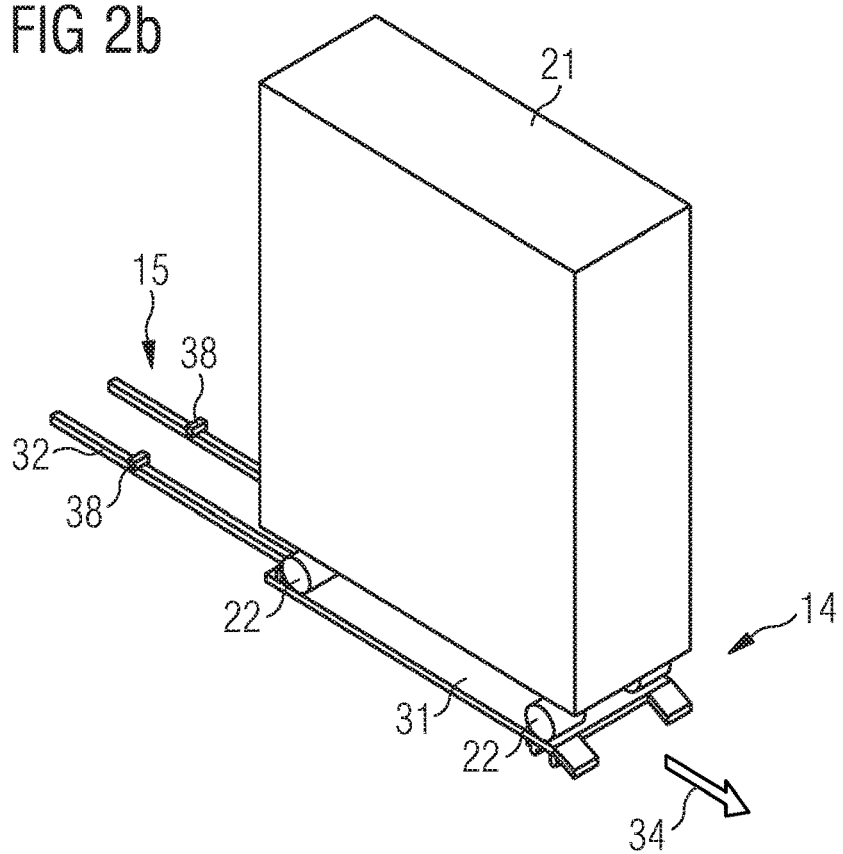

In FIGS. 2a and 2b, the stowage and removal system 30 according to the invention becomes somewhat clearer in a perspective illustration of the supply container 21 on the rear trolley storage space 15. FIG. 2a shows the supply container 21 in the storage position. The supply container 21 stands on a transfer plate 31 which is mounted movably on a rail system 32 and which can be moved in a removal direction 34. The rail system 32 is fixed in the bottom region of the receiving space 10 (see FIG. 1). In the case of the configuration as a trolley storage space in a galley, this can be provided directly on the aircraft floor within the galley or else on the floor which belongs to the receiving space 10. In the front region, the transfer plate 31 has assisting ramps 33 which make the moving of the rollers 22 of the supply container 21 onto the transfer plate 31 and down from it again, possible. In the storage position, the rear rollers 22 of the supply container 21 can move up to a stop 35 which defines the storage position and prevents over running of the transfer plate 31. FIG. 2b shows the supply container 21 in the removal position. For this purpose, the transfer plate 31 is moved on the rail system 32 in the removal direction 34 as far as the front end position, and is positioned at least partially on the front trolley storage space 14. For this purpose, front locking elements 37 (shown in FIG. 4) are provided on a front end stop 39 (shown in FIG. 4). Rear end stops 38 which hold the transfer plate 31 firmly in an operative connection with rear locking elements 36 (shown later) in the storage position can be seen on the rail system 32.

Figure 3A:
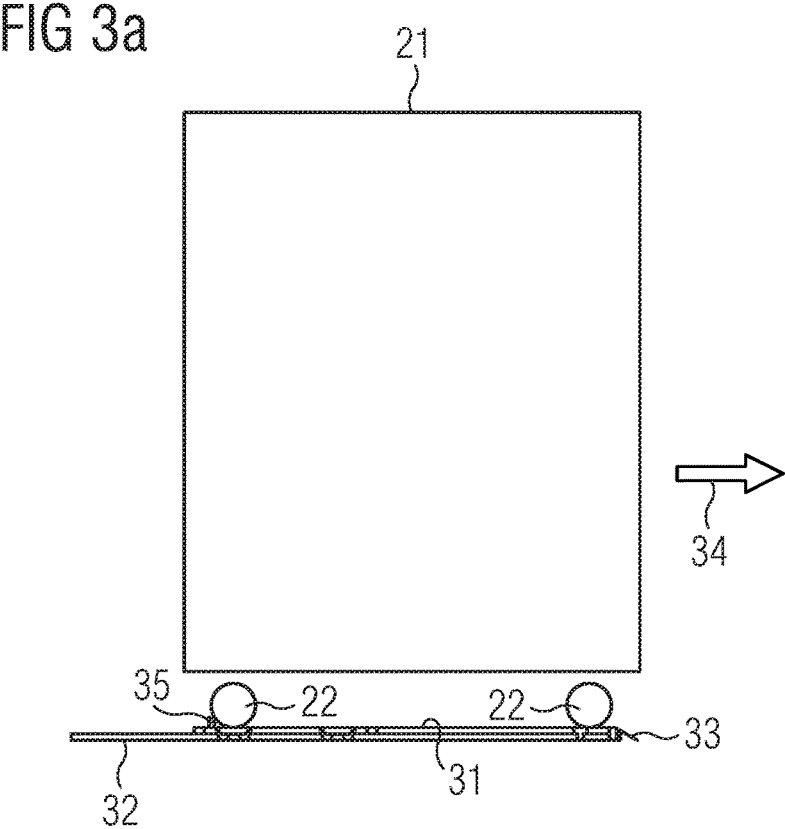
FIGS. 3a and 3b show the supply container on a transfer plate in a view from the side in the storage position and in the removal position.
Figure 3B:
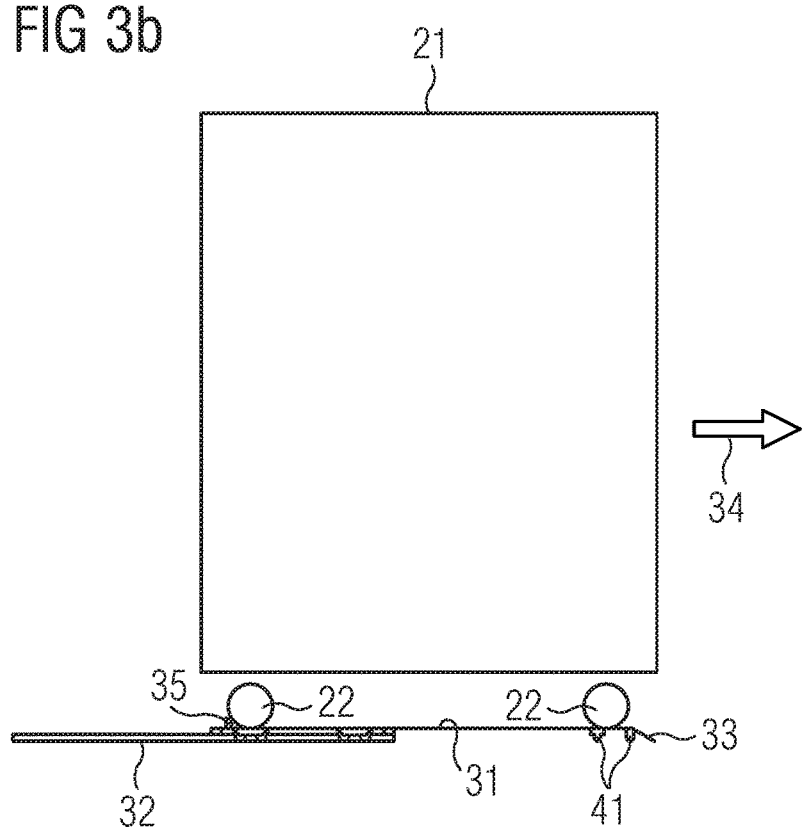

FIGS. 3a and 3b show the supply container 21 in a side view, positioned on the transfer plate 31 in the storage position and the removal position. The rail system 32 is configured as a linear guide system, the guide rails of which are of flat construction. The design height of the rails lies in a range of from 5 to 20 mm. This ensures that the moving-up height onto the transfer plate 31 can be selected in such a way that the handling of usually fully loaded and therefore heavy supply containers which can be rolled over the assisting ramps 33 remains manageable. FIG. 3a shows the storage position. The supply container 21 is positioned on the transfer plate 31, and the rear rollers 22 of the supply container 21 are in contact with the rear stop 35 of the transfer plate 31, in order to ensure secure footing of the supply container 21 on the transfer plate 31.

FIG. 3b shows the supply container 21 in the removal position, that is to say, the transfer plate 31 has been moved in the removal direction 34 by means of the rail system 32. In order to ensure secure footing and a movement capability of the transfer plate 31 even beyond the guide rails of the rail system 32, rolling elements 41 are arranged in the front region of the transfer plate 31.

Figure 4A:
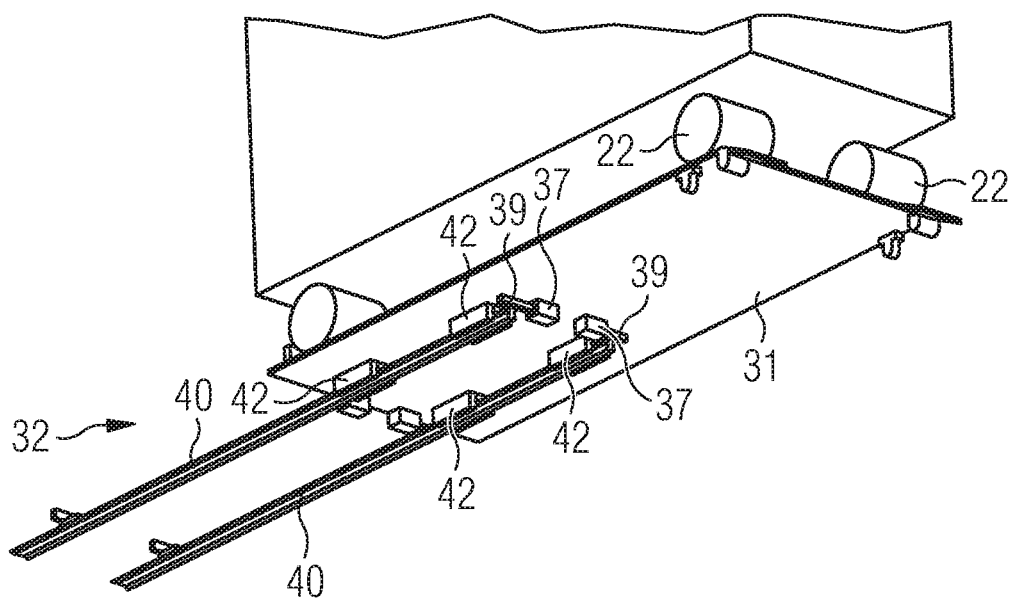
FIGS. 4a and 4b show detailed views of the supply container arranged on the stowage and removal system in the removal position.
Figure 4B:
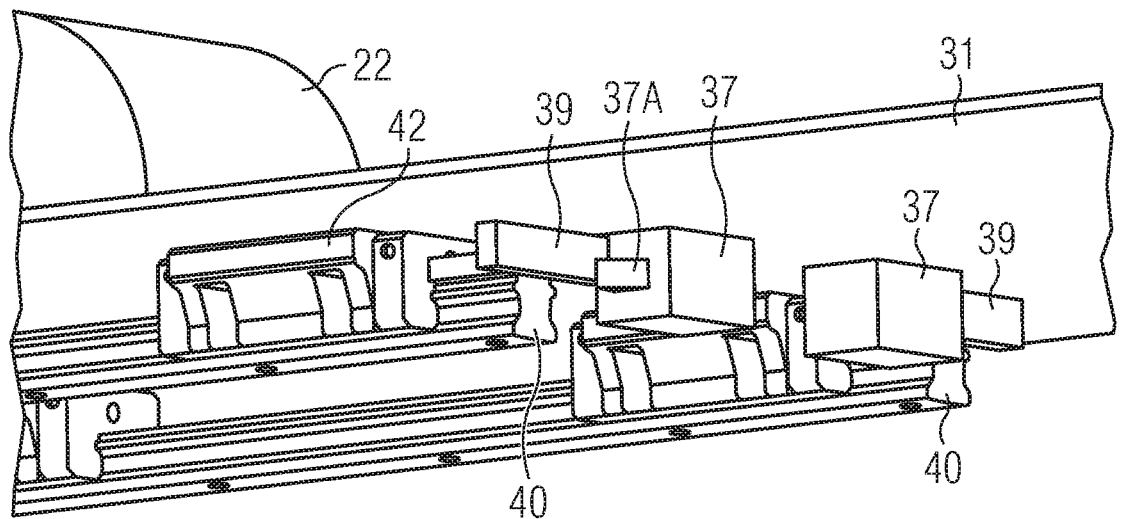

FIGS. 4a and 4b show detailed views of the supply container 21 arranged on the stowage and removal system 30 in the removal position, and one advantageous embodiment of the rail system 32 and its method of operation.

With a view from below, FIG. 4a shows the rail system 32 which is arranged below the transfer plate 31. The movement bodies 42 which run on guide rails 40 are fastened to the transfer plate 31. The guide rails 40 are preferably configured as linear guide rails, it also being possible for telescopic rails to be used. A locking action of the position of the transfer plate 31 can take place at a front end stop 39, fastened in each case to the corresponding guide rail 40, in order then to reliably make a removal movement of the supply container 21 from the fixed transfer plate possible.

FIG. 4b shows a detailed view of the guide rails 40, the respective movement body elements 42 and the front locking means 37. The front locking means 37, provided, for example, with a latch 37A, has moved beyond the front end stop 39 in this pulled-out position of the transfer plate 31 (entry and removal position of the supply container 21), and locks the transfer plate 31 for the loading and unloading operation.

With a view of the rear side of the supply container 21, FIG. 5 shows the rear stop 35 for the rollers 22 for positioning the supply container 21. Here, the transfer plate 31 is in the frontmost position of the rail system 32 on the guide rails 40. In this position, the transfer plate 31 can be moved, that is to say, the transport plate 31 can be moved with the supply container 21 into the storage position from the shown moved-out position (removal position) by way of the action of force, assisted manually or else by way of drives. Rear end stops 38 which interact with rear locking means 36 of the transfer plate 31 are provided as an end position of the transfer plate 31.

Figure 6A:
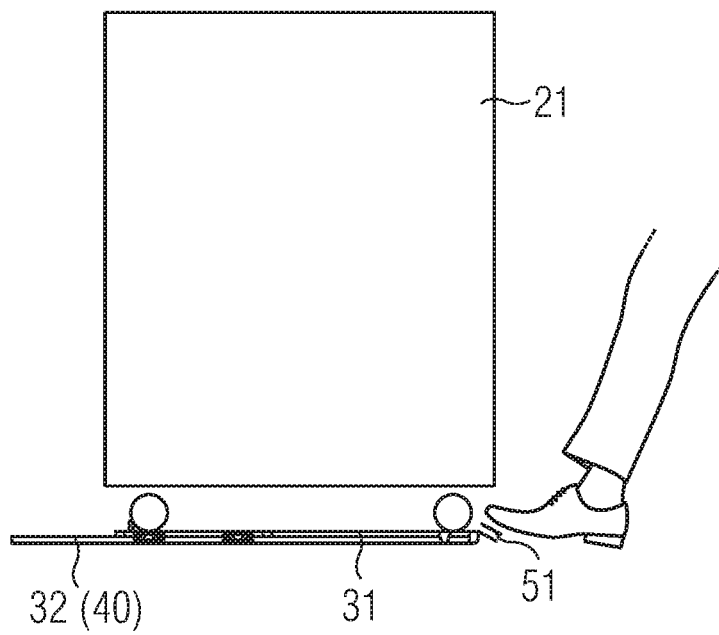
FIGS. 6a to 6c show a first embodiment of a locking apparatus with a mechanical cable pull actuation means.
Figure 6B:
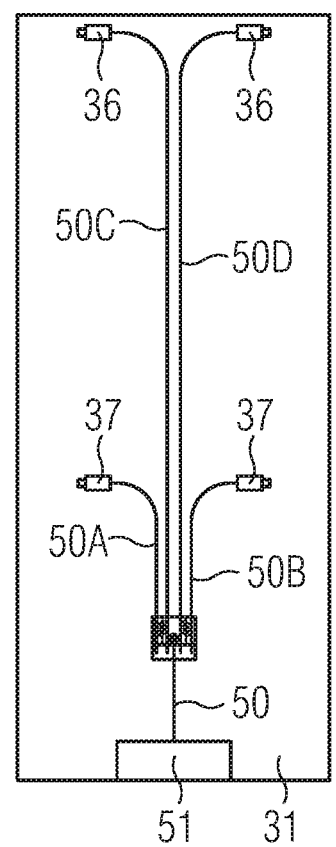
Figure 6C:
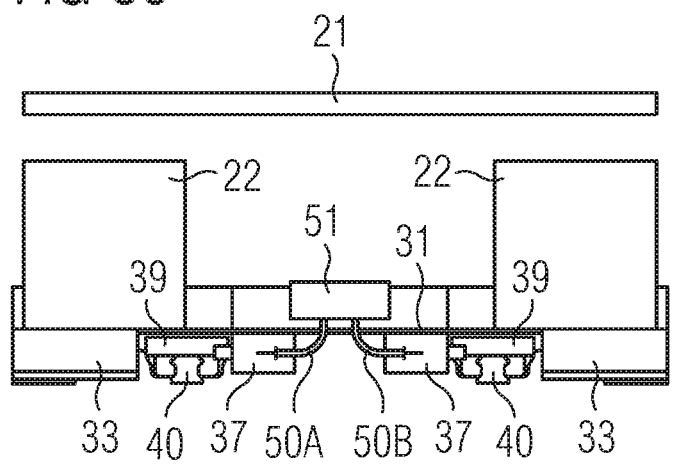

FIGS. 6a, 6b and 6c show the supply container 21 which is positioned on the transfer plate 31 in a side view, a view from below and in a view from the front in a detailed illustration. It can be seen in FIG. 6b that the transfer plate 31 is fitted on the underside with an embodiment of front and rear locking apparatuses 37 and 36 which are actuated via at least one mechanical cable pull 50, preferably four cable pulls 50A, 50B, 50C and 50D in accordance with the exemplary embodiment which is shown. The cable pulls 50 are preferably configured in the manner of Bowden cables, and can be actuated, for example, via a foot pedal 51 and can therefore lock and unlock the locking means. An alternative actuation means of the cable pulls 50 can also be a lever element which can be operated by hand (not shown). It is also conceivable that the rear locking means 36 are used optionally, that is to say, can also be dispensed with.

It can be seen in FIG. 6c in a detailed illustration in the view from the front that the front two bolt elements 37 are actuated via the respective cable pull 50A and 50B, and this is made possible by way of the actuation of the diagrammatically shown foot pedal 51.

Figure 7A:
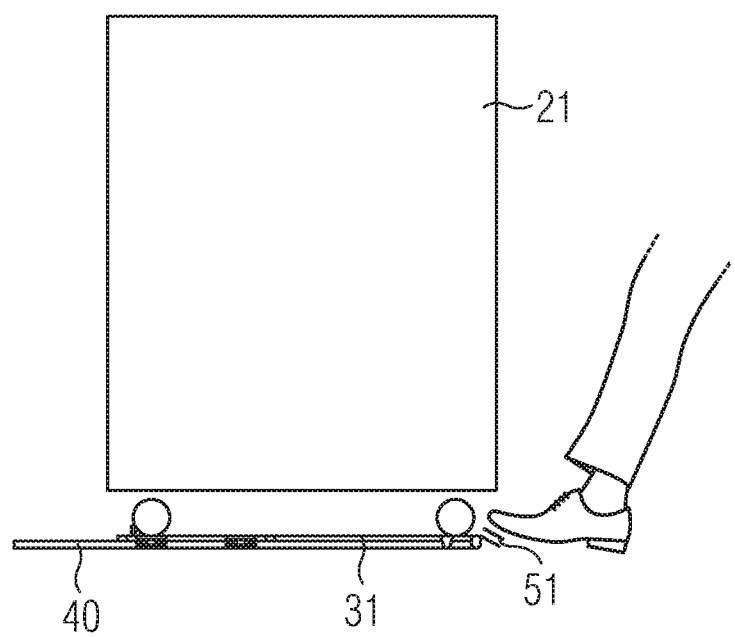
FIGS. 7a and 7b show a second embodiment of a locking apparatus with an electromechanical actuation means.
Figure 7B:
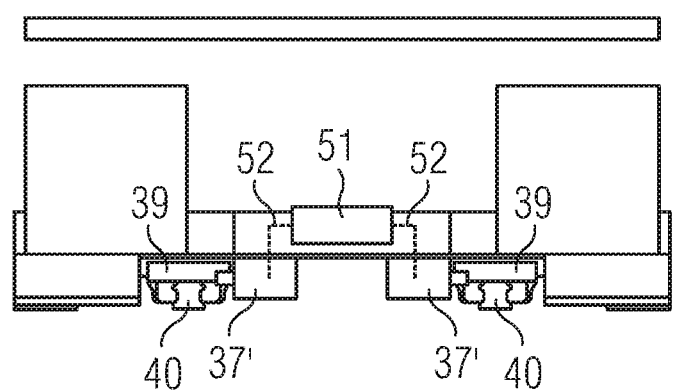

FIGS. 7a and 7b show a second embodiment of an actuation and locking apparatus. FIG. 7a shows, in a side view, that an operation can take place via a foot pedal 51, in order to release the locking means. FIG. 7b shows diagrammatically that the foot pedal 51 can actuate the locking elements 37' in the manner of an electromechanical actuation. Signal lines 52 can be used for this purpose, but wireless actuations can also take place.

Figure 8A:
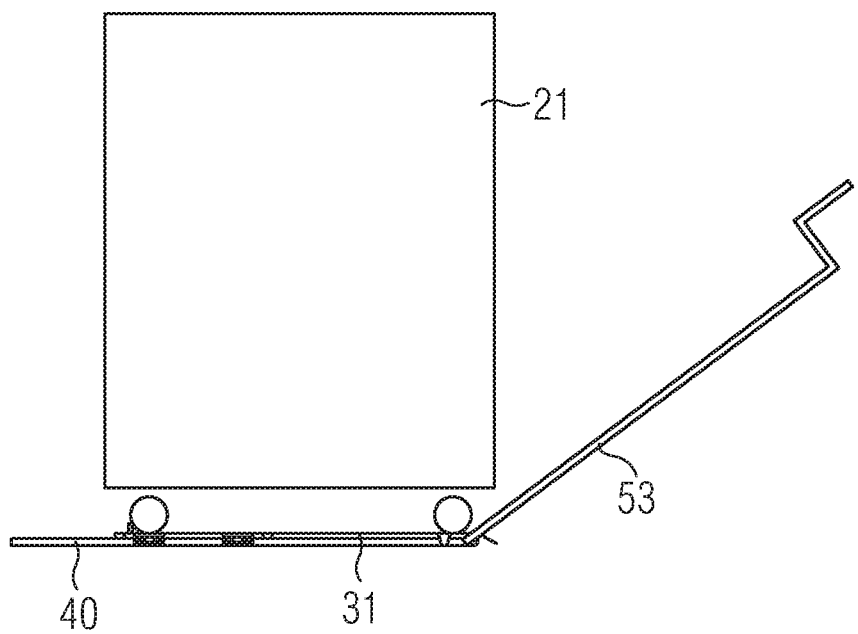
FIGS. 8a and 8b show a third embodiment of a locking apparatus with a mechanical actuation means.
Figure 8B:
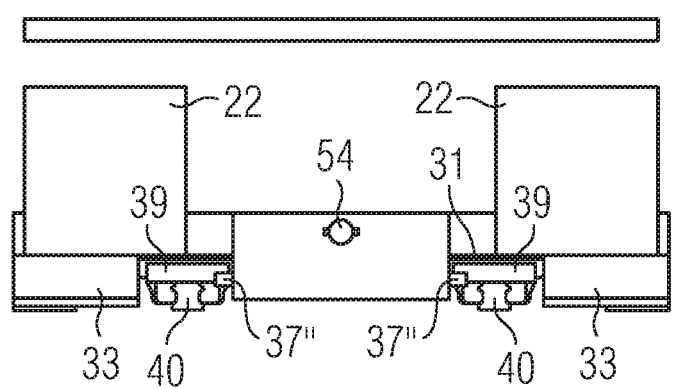

FIGS. 8a and 8b show a third embodiment of a locking apparatus with mechanical actuation in a diagrammatic illustration. It is provided here that a hand crank 53 engages into a lock element 54 and actuates the locking element 37" or a plurality of locking elements 37" by way of rotation in the lock element 54. By way of the use of the hand crank 53, after the latching and rotation in the lock element 54, an introduction of load/action of force can also take place at the same time on the transfer plate 31, and the plate can therefore also be moved.

Figure 9A:
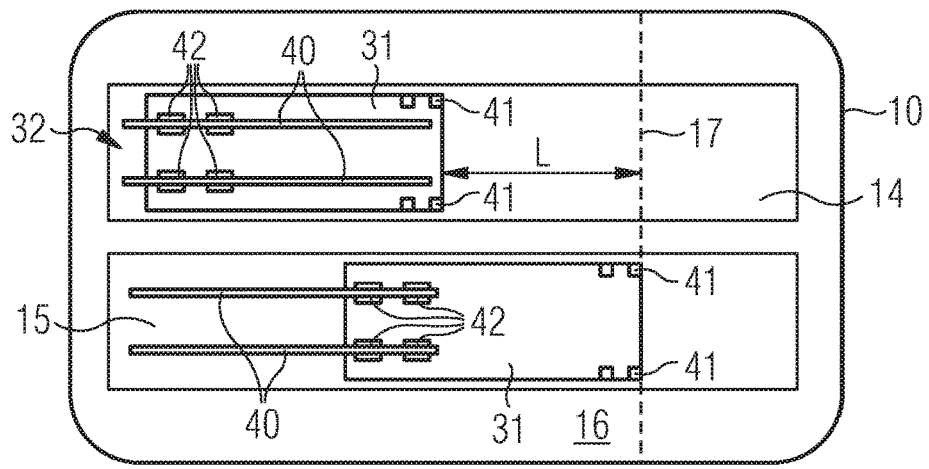
FIGS. 9a to 9c show the rail system in alternative embodiments.
Figure 9B:
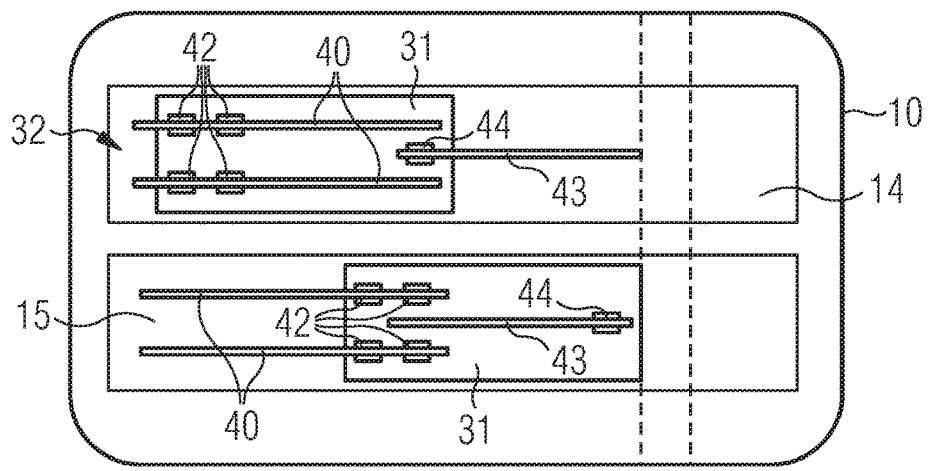
Figure 9C:
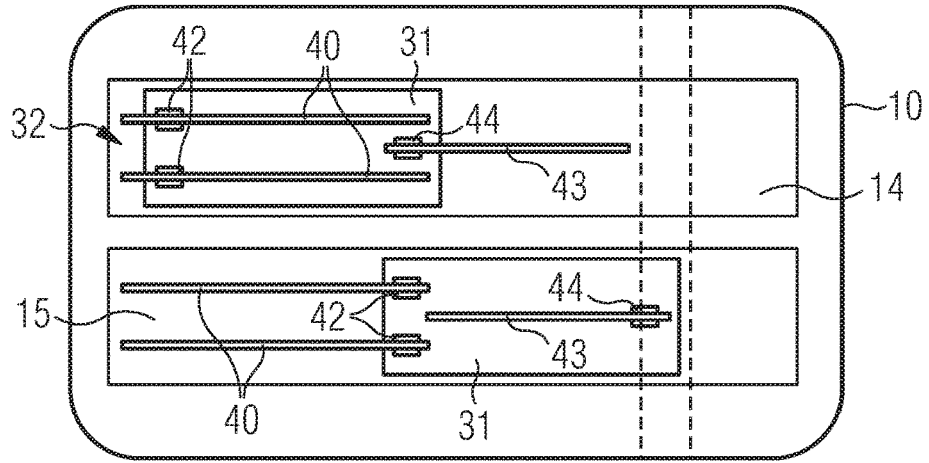

FIGS. 9a to 9c show the rail system 32 in alternative embodiments. The position of the guide rails 40, the movement bodies 42 which are provided on the transfer plate 31, and the positions of the transfer plate 31 in the storage position (upper illustration) and in the removal position (lower illustration) within the receiving space 10 are indicated in each case diagrammatically.

It can be seen in FIG. 9a that two guide rails 40 which run in parallel and are fastened to the bottom 16 mount the transport plate 31 via the movement bodies 42 in the rear region of the receiving space 10. It can be seen in this embodiment that rolling elements 41 are also arranged in the front region of the transport plate 31, which rolling elements 41 support the front region of the transport plate 31, and movement bodies 42 are positioned in the rear region of the transport plate 31 and mount the rear part of the transport plate 31. Two movement bodies 42 per guide rail 40 are shown in this embodiment, but one movement body per guide rail 40 can also be sufficient depending on the structural design of the movement body 42. In accordance with the change of the right-hand outer edge of the transfer plate 31 from the storage position to the removal position, it can be seen (see dashed line 17) that, in this way, a supply container has been moved much closer to the removal opening and, in this position, the supply container can be pulled down from the transfer plate 31 by the cabin crew in a comfortable access region. The covered path L of the transfer plate 31 is dependent on the length of the guide rails 40 and the positioning of the movement bodies 42. In this embodiment, it is essential that the guide rails 40 which are arranged in the bottom 16 of the receiving space 10 are fastened only in that part, in which the rear trolley storage space is provided. In other words, the guide rails 40 of the rail system 32 are arranged in such a way that they do not impede the moving in and out of a supply container 20 to or from the front trolley storage space 14.

FIG. 9b shows an alternative embodiment of the rail system 32. The principle of mounting of the rear region of the transfer plate 31 on guide rails 40 by means of movement bodies 42 corresponds substantially to the method of operation in accordance with the first embodiment. A high stability is achieved, however, by way of the use of a third central guide rail 43 which is oriented in the longitudinal axis of the transfer plate 31 and is operatively connected to a central movement body 44 which is positioned in the front region of the transfer plate 31. The omission of the rolling elements 41 is possibly made possible. This is optional, however, and can nevertheless be retained if required even in the case of this embodiment, for example if the stability of the transfer plate 31 is improved by way of the high loads of the supply container.

The arrangement of the central guide rail 43 is to be performed with consideration of the possible influencing of the front trolley storage space 14. Since a supply container 20 which is to be parked on the front trolley storage space 14 usually has the rollers 22 arranged on the outer edge region of the container housing, however, an arrangement of a central guide rail 43 can be possible, however, without impeding the movement travel of the front supply container 20.

FIG. 9c shows a third possible embodiment of the rail system 32. The principles of the second embodiment are substantially retained, but the number of movement bodies 42 which are connected to the transfer plate 31 and run on the guide rails 40 have been reduced to two. A sufficient firmness of the mounting of the transport plate 31 is achieved together with the central movement body 44 which runs on the guide rail 43. It can be seen that it has been possible for the movement travel of the transfer plate 31 to the removal opening to be improved again by way of an embodiment of this type.

As has also already been mentioned in respect of the second embodiment, the use of rolling elements 41 on the transfer plate 31, as are known from FIG. 9a, is also optionally possible in this embodiment.

One embodiment (not shown) can also be realized by way of only a central guide rail 43. Here, the guide rail 43 would then have to lead as far as the rear wall 11 of the receiving space 10. The central movement body 44 is then also to be designed accordingly, or two or more movement bodies 44 are to be provided on the transfer plate 31.

As a consequence, by way of the components which are shown, a stowage and removal system which is simple but nevertheless very effective can be realized which can considerably increase the compactness of a galley or other devices, since a storage space with sufficient depth can be filled with a plurality of serving carts behind one another, without it being necessary for restrictions which result by way of the handling of a user with an average body size to be taken into consideration.

Figure 10:
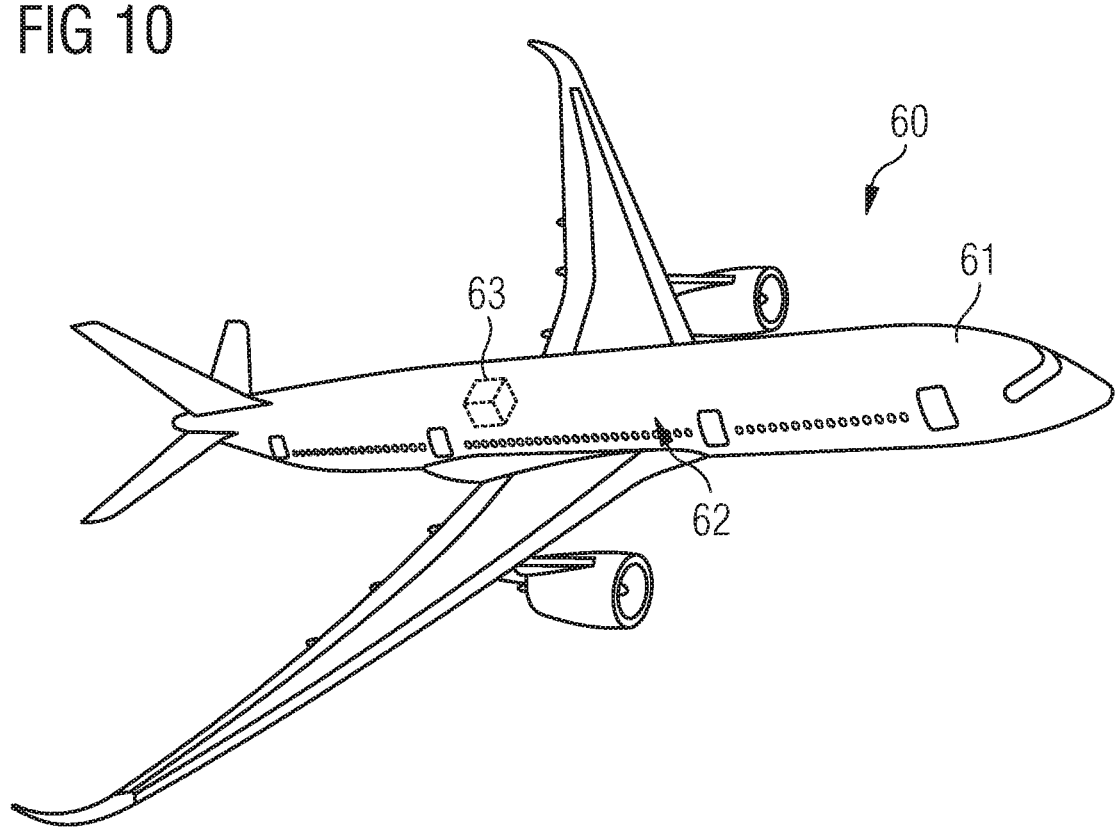
FIG. 10 shows an aircraft with a cabin, in which a galley with a receiving space is arranged, equipped with a stowage and removal system according to the invention.

Finally, FIG. 10 shows an aircraft 60 with a fuselage 61 and a cabin 62 which is configured therein and in which a cabin monument 63 can be arranged which has a receiving space 10 for supply containers and is equipped with a stowage and removal system 30 according to the invention.

In addition, it is to be noted that features which have been described with reference to one of the above exemplary embodiments can also be used in combination with other features of other above-described exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "having," "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A stowage and removal system for a receiving space for storage for one or more containers in a vehicle, comprising:
   a rail system in a bottom region of the receiving space, and
   a transfer plate which can be moved on the rail system in a bottom region of the receiving space, and assumes a storage position and a removal position for the container,
   wherein the storage position of the container, with a rear wall of the container in a region of a rear wall of the receiving space, and the removal position, are provided in a region of a push-in opening for pushing in and removing a container into or from the receiving space in a manner which is arranged so as to lie opposite the rear wall,
   wherein the receiving space is configured to receive at least two containers which are arranged behind one another, a rear container being positioned on the transfer plate and a front container being positioned on the bottom region of the receiving space.

2. The system according to claim 1, wherein the rail system comprises:
   guide rails which are arranged in the region of the storage position on a floor of the vehicle in a movement direction of the transfer plate, and
   movement bodies which engage into the guide rails being arranged on the transfer plate.

3. The system according to claim 1, wherein the transfer plate has at least one locking apparatus for releasably locking the transfer plate for the removal position.

4. The system according to claim 3, wherein the at least one locking apparatus is configured to be actuated mechanically or electromechanically.

5. The system according to claim 1, further comprising at least one positioning device of the container on the transfer plate.

6. The system according to claim 1, wherein assisting ramps for containers are arranged at least one of on the transfer plate or at a corresponding position on the bottom region of the receiving space.

7. The system according to claim 1, wherein the rail system has two guide rails which run parallel to outer edges of the transfer plate.

8. The system according to claim 7, wherein the two guide rails correspond with movement bodies which are arranged on an underside of the container, in a rear region of the transfer plate.

9. The system according to claim 1, wherein rolling elements are arranged on the transfer plate in a front region.

10. A vehicle with a cabin and a cabin monument which is situated in the cabin and has a stowage and removal system according to claim 1.

11. The vehicle according to claim 10, wherein the vehicle comprises a commercial aircraft.

12. A stowage and removal system for a receiving space for storage for one or more containers in a vehicle, comprising:
- a rail system in a bottom region of the receiving space, and
- a transfer plate which can be moved on the rail system in a bottom region of the receiving space, and assumes a storage position and a removal position for the container,
- wherein the storage position of the container, with a rear wall of the container in a region of a rear wall of the receiving space, and the removal position, are provided in a region of a push-in opening for pushing in and removing a container into or from the receiving space in a manner which is arranged so as to lie opposite the rear wall, and
- wherein the rail system has two guide rails which run parallel to outer edges of the transfer plate,
- the system further comprising a central guide rail which runs offset longitudinally with respect to the two guide rails and protrudes beyond a center of the receiving space into a front region of the receiving space.

* * * * *